United States Patent
Gruber, Jr. et al.

(10) Patent No.: US 10,062,210 B2
(45) Date of Patent: Aug. 28, 2018

(54) APPARATUS AND METHOD FOR RADIANCE TRANSFER SAMPLING FOR AUGMENTED REALITY

(71) Applicant: QUALCOMM Incorporated, San Diego, CA (US)

(72) Inventors: Lukas Gruber, Jr., Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/189,838

(22) Filed: Feb. 25, 2014

(65) Prior Publication Data

US 2014/0320530 A1    Oct. 30, 2014

Related U.S. Application Data

(60) Provisional application No. 61/815,692, filed on Apr. 24, 2013.

(51) Int. Cl.
  *G09G 5/00*   (2006.01)
  *G06T 15/80*  (2011.01)
  (Continued)

(52) U.S. Cl.
  CPC .......... *G06T 19/006* (2013.01); *G06T 15/50* (2013.01); *G06T 15/506* (2013.01); *G06T 15/55* (2013.01);
  (Continued)

(58) Field of Classification Search
  CPC ....... G06T 15/50; G06T 15/506; G06T 15/55; G06T 15/80; G06T 15/06; G06T 15/60
  (Continued)

(56) References Cited

U.S. PATENT DOCUMENTS 6,628,298 B1 *  9/2003  Debevec .............. G06T 15/506
                                                       345/632
7,164,420 B2    1/2007  Ard
                        (Continued)

FOREIGN PATENT DOCUMENTS

| CN | 1619597 A    | 5/2005 |
| JP | H07182538 A  | 7/1995 |
| JP | 2009134681 A | 6/2009 |

OTHER PUBLICATIONS

J. Jachnik, R. A. Newcombe, and A. J. Davison. Real-time surface light-field capture for augmentation of planar specular surfaces. In ISMAR, pp. 91-97, 2012.*

(Continued)

*Primary Examiner* — Jin-Cheng Wang
(74) *Attorney, Agent, or Firm* — Kilpatrick Townsend & Stockton

(57) ABSTRACT

Methods, systems, computer-readable media, and apparatuses for radiance transfer sampling for augmented reality are presented. In some embodiments, a method includes receiving at least one video frame of an environment. The method further includes generating a surface reconstruction of the environment. The method additionally includes projecting a plurality of rays within the surface reconstruction of the environment. Upon projecting a plurality of rays within the surface reconstruction of the environment, the method includes generating illumination data of the environment from the at least one video frame. The method also includes determining a subset of rays from the plurality of rays in the environment based on areas within the environment needing refinement. The method further includes rendering the virtual object over the video frames based on the plurality of rays excluding the subset of rays.

26 Claims, 5 Drawing Sheets

(51) Int. Cl.
- G06T 15/50 (2011.01)
- G06T 15/60 (2006.01)
- G06T 19/00 (2011.01)
- G06T 15/55 (2011.01)
- G06T 15/06 (2011.01)

(52) U.S. Cl.
CPC .............. *G06T 15/06* (2013.01); *G06T 15/60* (2013.01); *G06T 15/80* (2013.01); *G06T 2215/16* (2013.01)

(58) Field of Classification Search
USPC .................................................. 345/426, 582
See application file for complete search history.

(56) References Cited

U.S. PATENT DOCUMENTS

| | | | |
|---|---|---|---|
| 8,259,110 | B1 | 9/2012 | Carr et al. |
| 2009/0109240 | A1 | 4/2009 | Englert et al. |
| 2009/0128552 | A1 | 5/2009 | Fujiki et al. |
| 2012/0120071 | A1 | 5/2012 | Thorn |

OTHER PUBLICATIONS

D. Nowrouzezahrai, S. Geiger, K. Mitchell, R. Sumner, W. Jarosz, and M. Gross. Light factorization for mixed-frequency shadows in augmented reality. In Proceedings of the 2011 10th IEEE International Symposium on Mixed and Augmented Reality, ISMAR '11, p. 173-179, Washington, DC, USA, 2011. IEEE Computer Society.*

L. Gruber, T. Richter-Trummer, and D. Schmalstieg. Real-time photometric registration from arbitrary geometry. In 2012 IEEE International Symposium on Mixed and Augmented Reality (ISMAR), pp. 119-128, Nov. 2012.*

Fran_cois Fouquet, Jean-Philippe Farrugia, Sylvain Brandel. A Voxel-Based Approach for Virtual Objects Relighting. Computer graphics international, Jun. 2011, Ottawa, Canada. digital proceedings, 2011.*

Sloan, P., Kautz, J., and Snyder, J. 2002. Precomputed radiance transfer for real-time rendering in dynamic, low-frequency lighting environments. In Proc. of SIGGRAPH, ACM Press, 527-536.*

Toshiya Hachisuka, et al., "Multidimensional Adaptive Sampling and Reconstruction for Ray Tracing", Proc. ACM SIGGRAPH 2008, vol. 27, Issue 3, Aug. 2008, Article No. 33, pp. 33:1-33:10.*

K. Egan, et al., "Frequency Analysis and Sheared Filtering for Shadow Light Fields of Complex Occluders", ACM Trans. Graph. vol. 30, Issue 2, Apr. 2011, Article 9, pp. 9:1-9:13.*

T. Franke and Y. Jung, "Real-time mixed reality with GPU techniques," GRAPP, 2008, pp. 249-252.*

M. Knecht, et al., "Differential Instant Radiosity for Mixed Reality", IEEE International Symposium on Mixed and Augmented Reality 2010 Science and Technology Proceedings, Oct. 13-16, 2010, Seoul, Korea, pp. 99-107.*

S. Gibson, J. Cook, T. Howard, and R. Hubbold. Rapid shadow generation in real-world lighting environments. In Eurographics Symposium on Rendering, 2003, pp. 219-229.*

Papagiannakis George, et al., "Practical Precomputed Radiance Transfer for Mixed Reality," In proceeding of: Practical Precomputed Radiance Transfer for Mixed Reality, 2005, 18 pgs.

Gruber, L., et al., "Real-Time Photometric Registration from Arbitrary Geometry," IEEE International Symposium on Mixed and Augmented Reality 2012 Science and Technology Proceedings (ISMAR), Nov. 2012, pp. 119-128.

International Search Report and Written Opinion—PCT/US2014/018775—ISA/EPO—May 8, 2014.

Painter, J., et al., "Antialiased Ray Tracing by Adaptive Progressive Refinement" Computer Graphics, vol. 23. No. 3. Jul. 31, 1989, pp. 281-288.

Sato, I., et al.,"Acquiring a Radiance Distribution to Superimpose Virtual Objects Onto a Real Scene", IEEE Transactions on Visualization and Computer Graphics, vol. 5., No. 1, Mar. 1999), pp. 1-10.

Scherzer, D., et al., "Temporal Coherence Methods in Real-Time Rendering," Computer Graphics forum, vol. 31 (2012), No. 8, 29 pages.

Xiao L., et al., "Ray Casting Based Terrain Rendering Algorithm Fully Implemented with GPU", Computer Simulation, No. 2, Feb. 2010, pp. 226-230.

Tomite K., et al., "Rendering Shadows with Raytracing in Mixed Reality", IEICE Technical Report, Japan, The Institute of Electronics, Information and Communication Engineers, Jan. 10, 2008, vol. 107, No. 427, pp. 75-80.

* cited by examiner

APPARATUS AND METHOD FOR RADIANCE TRANSFER SAMPLING FOR AUGMENTED REALITY

CROSS-REFERENCE TO RELATED APPLICATIONS

This applications claims priority to U.S. Provisional Application No. 61/815,692, filed Apr. 24, 2013 entitled "Efficient Radiance Transfer Sampling for Augmented Reality" which is incorporated herein by reference.

BACKGROUND

Aspects of the disclosure relate to augmented reality. More specifically, aspects of the disclosure relate to radiance transfer sampling for augmented reality.

Photorealistic rendering of combined virtual and real scenes is a fundamental goal for many augmented reality (AR) applications, such as games or advertising. Current solutions make use of existing software development kits to obtain scene models with real time updates and 3-D tracking of the camera used to capture the image. A solution aiming at photorealistic AR images based on global illumination will typically compute the radiance transfer (RT) for every surface point in view. The RT is used to sample environment illumination information directly from the scene model. The RT information together with the environment illumination and the scene model is used to generate realistic renders of virtual objects in the real scene. The resulting images have a perceptually plausible approximation of the light interactions between the environment, virtual objects, and real objects.

However, computing RT for dynamically changing scenes represented as voxel volumes requires volumetric raytracing. Applying this procedure for all visible surface points of the scene model in every frame is computationally expensive. Even with the use of faster processors, it is likely necessary to resort to regular subsampling to obtain acceptable interactive speeds. The use of simple subsampling introduces undesirable aliasing artifacts and is not an optimal solution.

BRIEF SUMMARY

Certain embodiments describe an apparatus and method for improved radiance transfer sampling for augmented reality.

Systems and methods disclosed herein allow for improved radiance transfer sampling for augmented reality by exploiting 4-D spatial as well as temporal coherence of a visibility signal by applying adaptive sampling, filtering, and reconstruction approaches. These approaches for RT computation increase efficiency and provide higher quality results. They also allow for more control over the trade-off between computational expense and image quality, which is important mobile devices.

In some embodiments, a method includes receiving at least one video frame of an environment. The method further includes generating a surface reconstruction of the environment. The method additionally includes projecting a plurality of rays within the surface reconstruction of the environment. Upon projecting a plurality of rays within the surface reconstruction of the environment, the method includes generating illumination data of the environment from the at least one video frame. The method also includes determining a subset of rays from the plurality of rays in the environment based on areas within the environment needing refinement. The method further includes rendering a virtual object over the at least one video frame based on the plurality of rays excluding the subset of rays.

In some embodiments, the areas within the environment needing refinement include shadow areas, surface edges, and shadow edges.

In some embodiments, the method further includes generating estimated real world lighting data of the environment in the at least one video frame based on the surface reconstruction and the illumination data.

In some embodiments, the determining a subset of rays from the plurality of rays comprises applying lighting and differential rendering techniques to the environment and analyzing shadow information as a result thereof.

In some embodiments, the determining a subset of rays from the plurality of rays comprises applying adaptive sampling techniques based on at least one of a 4-D subdivision of a ray space comprising the plurality of rays and an approximated variance analysis.

In some embodiments, the method further includes storing temporal coherence information associated with the subset of rays in a two-level hierarchical cache, wherein the first level stores the information in a screen space and the second level stores the information in an object space.

In some embodiments, generating the illumination data includes converting the at least one video frame into intensity components and color components and denoising the intensity components to extract the illumination data.

In some embodiments, generating the surface reconstruction of the environment is performed using at least one of the at least one video frame, images from a stereo camera, or a depth image from a depth camera.

In some embodiments, an apparatus includes a camera, a memory, and a processor. The processor is coupled to the memory to receive at least one video frame of an environment captured by the camera. The processor is configured to generate a surface reconstruction of the environment. The processor is further configured to project a plurality of rays within the surface reconstruction of the environment of the environment. The processor is also configured to generate illumination data of the environment from the at least one video frame. The processor is additionally configured to determine a subset of rays from the plurality of rays in the environment based on areas within the environment needing refinement. The processor is further configured to render a virtual object over the at least one video frame based on the plurality of rays excluding the subset of rays.

In some embodiments, a method includes means for receiving at least one video frame of an environment. The method further includes means for generating a surface reconstruction of the environment. The method additionally includes means for projecting a plurality of rays within the surface reconstruction of the environment. Upon projecting a plurality of rays within the surface reconstruction of the environment, the method includes means for generating illumination data of the environment from the at least one video frame. The method also includes means for determining a subset of rays from the plurality of rays in the environment based on areas within the environment needing refinement. The method further includes means for rendering a virtual object over the at least one video frame based on the plurality of rays excluding the subset of rays.

In some embodiments, a processor-readable non-transitory medium includes processor readable instructions configured to cause a processor to receive a sequence of at least one video frame of an environment. The instructions are further configured to cause the processor to generate a surface reconstruction of the environment. The instructions are further configured to cause the processor to project a plurality of rays within the surface reconstruction of the environment. The instructions are further configured to cause the processor to generate illumination data of the environment from the at least one video frame. The instructions are further configured to cause the processor to determine a subset of rays from the plurality of rays in the environment based on areas within the environment needing refinement. The instructions are further configured to cause the processor to render a virtual object over the at least one video frame based on the plurality of rays excluding the subset of rays.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1A:
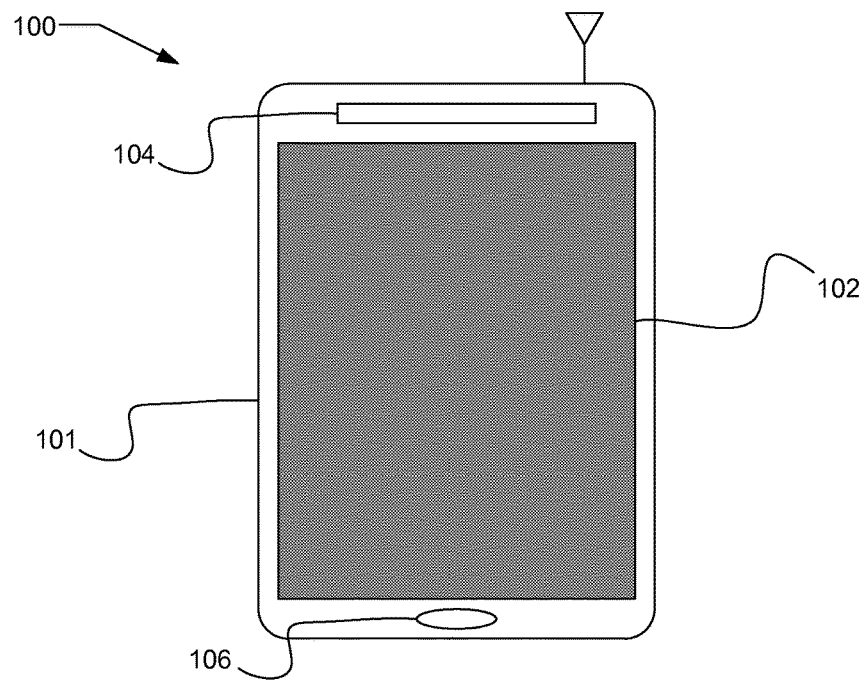
FIG. 1A illustrates a front side of a mobile device 100 capable of efficient radiance transfer sampling for photorealistic augmented reality as described above.
Figure 1B:
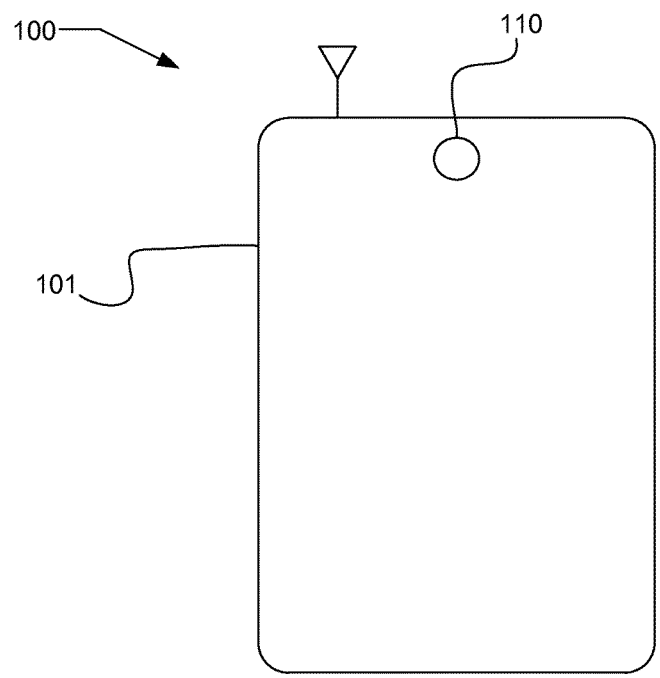
FIG. 1B illustrates a back side of a mobile device 100 capable of efficient radiance transfer sampling for photorealistic augmented reality as described above.

FIGS. 1A and 1B illustrate a front side and back side, respectively, of a mobile device 100 capable of efficient radiance transfer sampling for photorealistic augmented reality as described above.

The mobile device 100 is illustrated as including a housing 101, a display 102, which may be a touch screen display, as well as a speaker 104 and microphone 106. The mobile device 100 further includes a forward facing camera 110 to capture image(s) of the environment. It can be appreciated that the camera 110 may be a RGB camera, a depth camera, stereo camera, etc. The term "camera" may also refer to multiple cameras that may be of different types (e.g., an RGB camera and a depth camera). In the case that the camera 110 is a depth camera, it may provide depth data of the imaged environment. Alternatively, in the case that the camera 110 is a stereo camera, it may use at least one image (frame of video) from the camera 110 to produce depth data for the imaged environment.

As used herein, a mobile device refers to any portable electronic device such as a cellular or other wireless communication device, smart phone, personal communication system (PCS) device, personal navigation device (PND), Personal Information Manager (PIM), Personal Digital Assistant (PDA), smart watches, smart glasses, smart devices used in automobiles, smart devices used in homes, or other suitable mobile devices. The mobile device may be capable of receiving wireless communication and/or navigation signals, such as navigation positioning signals. The term "mobile device" is also intended to include devices which communicate with a personal navigation device (PND), such as by short range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment. It can be appreciated that a "mobile device" does not necessarily need a wireline or wireless connection.

The mobile device 100 captures at least one video frame using camera 110, sometimes referred to herein simply as images, of an environment with an arbitrary, i.e., a-priori unknown, geometry and lighting conditions. The mobile device 100 is configured to estimate the real-world lighting conditions from the captured video frames at a per frame basis and to apply lighting conditions to AR objects rendered in the display 102. In some embodiments, estimating the real-world light conditions from the captured video frames is done at every n frames. The mobile device 100 may also apply lighting effects from the AR objects on real world objects when the AR objects are rendered over the environment. The mobile device 100 is capable of estimating environmental lighting conditions from an arbitrary geometry in the environment. Thus, the mobile device 100 does not require special light probes, such as reflective spheres, to be placed in the real-world environment in order to estimate the real-world lighting conditions. The mobile device 100 may use arbitrary geometry in combination with radiance transfer computations and spherical harmonics to improve the estimation of the environment lighting.

Figure 2:
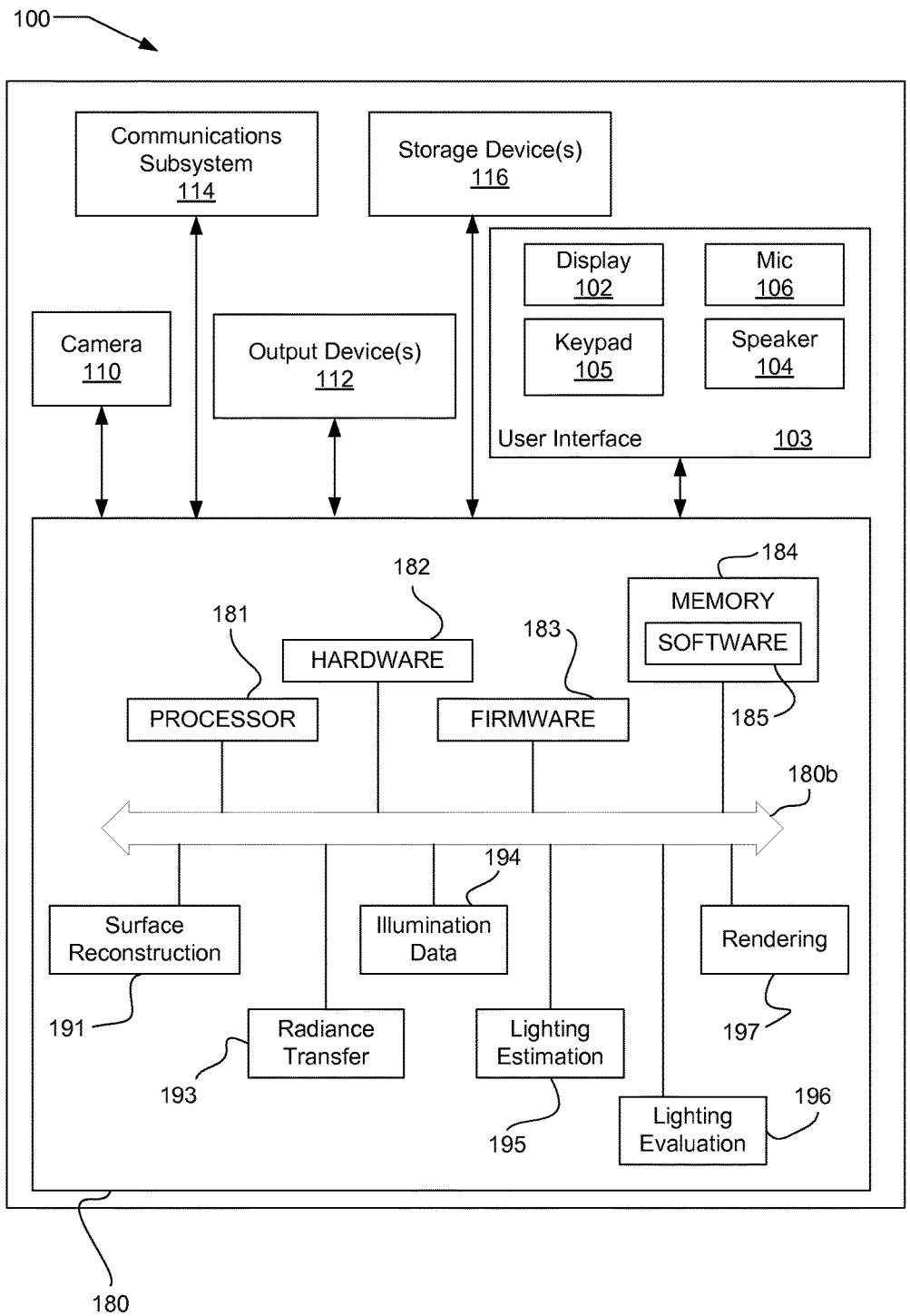
FIG. 2 is a block diagram of a mobile device capable of rendering a virtual object in an environment, according to an embodiment of the present invention.

FIG. 2 is a block diagram of a mobile device 100 capable of rendering a virtual object in an environment, according to an embodiment of the present invention. The mobile device 100 includes a camera 110. The mobile device 100 may further include a user interface 103 that includes a display 102, a keypad 105 or other input device through which the user can input information into the mobile device 100. If desired, the keypad 105 may be obviated by integrating a virtual keypad into the display 102 with a touch sensor. The user interface 103 may also include a microphone 106 and speaker 104, e.g., if the mobile device 100 is a mobile device such as a cellular telephone. Of course, mobile device 100 may include other elements unrelated to the present disclosure.

The mobile device 100 also includes a control unit 180 that is connected to and communicates with the camera 110. The control unit 180 may be provided by a bus 180b, processor 181 and associated memory 184, hardware 182, software 185, and firmware 183. The control unit 180 may include a surface reconstruction unit 191, which may generate the surface reconstruction of the environment. A radiance transfer unit 193 generates the radiance transfer. An illumination data unit 194 generates illumination data based on the captured at least one video frame, e.g., including converting the images to intensity components and filtering the intensity components to optionally denoise the intensity components. A lighting estimation unit 195 determines the estimated lighting conditions based on the illumination data and the radiance transfer for the environment. A rendering unit 197 may render the virtual object over the at least one video frame based on the pose and lighting solutions, and may use differential rendering and compositing.

The various processing units, e.g., surface reconstruction unit 191, radiance transfer unit 193, illumination data unit 194, lighting estimation unit 195, lighting evaluation unit 196, and rendering unit 197, are illustrated separately, and separately from processor 181 for clarity, but all or some may be combined and/or part of the processor 181 or implemented in the processor based on instructions in the software 185 which is run in the processor 181. It will be understood as used herein that the processor 181, and/or the various processing units, can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 182, firmware 183, software 185, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 184 and executed by the processor 181. Memory may be implemented within or external to the processor 181. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

The mobile device 100 may further include (and/or be in communication with) one or more non-transitory storage devices 116, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The mobile device 100 might also include a communications subsystem 114, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 114 may permit data to be exchanged with a network, other computer systems, and/or any other devices described herein. In many embodiments, the mobile device 100 will further comprise a non-transitory working memory 184, which can include a RAM or ROM device.

The mobile device 100 may additionally include one or more output devices 112, which can include without limitation a display unit such as the device used in embodiments of the invention, a printer and/or the like. In some implementations of the embodiments of the invention, various user interface devices (e.g., display 102, mic 106, keypad 105, and speaker 104) and output devices 112 may be embedded into interfaces such as display devices, tables, floors, walls, and window screens. Furthermore, the user interface devices and output devices 112 coupled to the processors may form multi-dimensional tracking systems.

The mobile device 100 also can comprise software elements located within the memory 184, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed below might be implemented as code and/or instructions executable by the mobile device (and/or a processor within the mobile device); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 116 described above. In some cases, the storage medium might be incorporated within a computer system, such as mobile device 100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the mobile device 100 and/or might take the form of source and/or installable code, which, upon compilation and/or installation on the mobile device 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the mobile device 100 may be omitted or may be implemented separate from the illustrated system. For example, the processor 181 and/or other elements may be implemented separate from the user interface 103 devices. In one embodiment, the processor 181 is configured to receive images from one or more cameras 110 that are separately implemented. In some embodiments, elements in addition to those illustrated in FIG. 2 may be included in the mobile device 100.

Some embodiments may employ a mobile device (such as the mobile device 100) to perform methods in accordance with the disclosure. For example, some or all of the procedures of the described methods may be performed by the mobile device 100 in response to processor 181 executing one or more sequences of one or more instructions (which might be incorporated into the operating system and/or other code, such as an application program) contained in the memory 184. Such instructions may be read into the memory 184 from another computer-readable medium, such as one or more of the storage device(s) 116. Merely by way of example, execution of the sequences of instructions contained in the memory 184 might cause the processor(s) 181 to perform one or more procedures of the methods described herein.

The terms "machine-readable medium" and "computer-readable medium," as used herein, refer to any medium that participates in providing data that causes a machine to operate in a specific fashion. In some embodiments implemented using the mobile device 100, various computer-readable media might be involved in providing instructions/code to processor(s) 181 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 116. Volatile media include, without limitation, dynamic memory, such as the memory 184. Transmission media include, without limitation, coaxial cables, copper wire and fiber optics, including the wires that comprise the bus 180b, as well as the various components of the communications subsystem 114 (and/or the media by which the communications subsystem 114 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 181 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the mobile device 100. These signals, which might be in the form of electromagnetic signals, acoustic signals, optical signals and/or the like, are all examples of carrier waves on which instructions can be encoded, in accordance with various embodiments of the invention.

The communications subsystem 114 (and/or components thereof) generally will receive the signals, and the bus 180b then might carry the signals (and/or the data, instructions, etc. carried by the signals) to the memory 184, from which the processor(s) 181 retrieves and executes the instructions. The instructions received by the memory 184 may optionally be stored on a non-transitory storage device 116 either before or after execution by the processor(s) 181.

Figure 3:
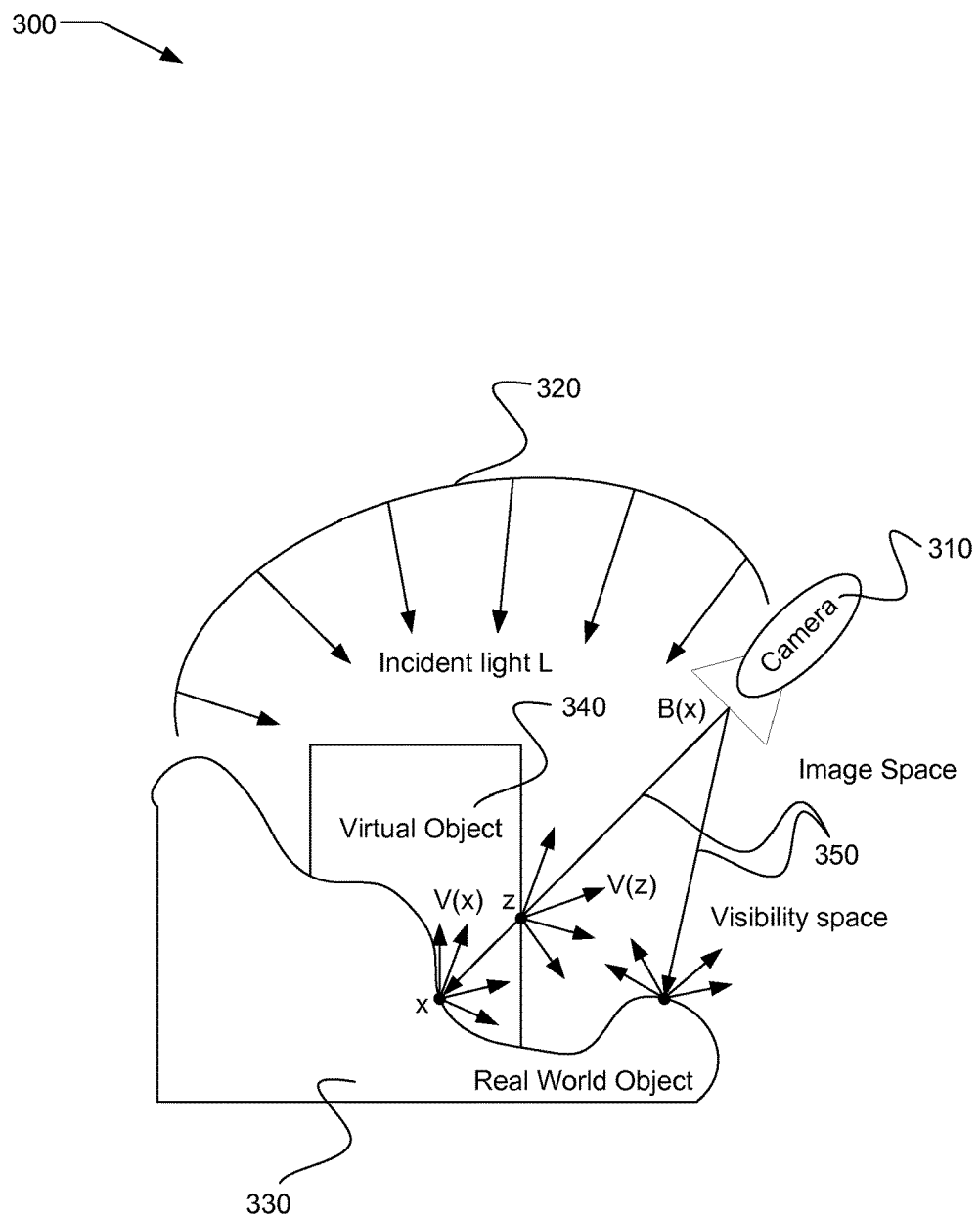
FIG. 3 illustrates a scene geometry including a real world object and a virtual world object, according to an embodiment of the present invention.

FIG. 3 illustrates a scene geometry 300 including a real world object 330 and a virtual world object 340. The scene geometry 300 also includes a camera 310 or a viewpoint from which a number of rays are projected into the world space. The world space includes both the real world object 330 and the virtual world object 340. The figure depicts the working area and its different domains. The camera 310 sends out rays 350 from the image space to determine the surface of the geometry and to measure the reflection B (the image intensities) of the surface points. The reflection measurements are in the image space. Once a ray hits the surface (e.g., at point x for the real-world object's surface and point z for the virtual world object's surface) the algorithm tests for visibility V(x) by sending out rays in different directions that uniformly sample a sphere. This is called the visibility space. A similar process may be carried out to test the visibility V(z).

As mentioned above, the current solutions have many limitations. One of these limitations is that computing RT requires ray tracing in the scene model. Applying this procedure for all visible surface points of the scene model in every frame is computationally expensive.

RT is the potential light interaction (outgoing and incoming light rays) for a given point on the surface of a scene. The rays are traced in order to determine if there is occluding geometry between the surface point and a distant environment light (visibility testing) and to determine how much light potentially falls onto the surface point. In some embodiments, compressing and storing the resulting RT in SH representation (e.g., 16 float values) may result in increased efficiency. However, to compute RT, a sufficient number of rays must be traced into the environment along every direction in order to sample the visibility (e.g., n=128 directions). The visibility signal can therefore be parameterized similar to a surface light field as a 4-D function:

$v(r, s, \varphi, \theta) \rightarrow 0$ if the point is blocked by another surface point $v(r, s, \varphi, \theta) \rightarrow 1$ otherwise (the ray can see the environment lighting)

where (r,s) denotes a point on the surface and ($\varphi$, $\theta$) denotes the direction of the ray. The 4-D spatial may be exploited as well as the temporal coherence of the signal by applying adaptive sampling, filtering, and reconstructions approaches. Although some approaches for using coherence in sampling for computer graphics applications exist, none have been applied to RT sampling for online or real-time reconstructed geometry. Computer graphics scenes are typically more predictable and thus RT can be naturally pre-computed. Pre-computing allows optimal runtime performance, however is challenging for dynamic scenes. AR applications must support these dynamic scenes.

Interleaved Sampling in Screen and Visibility Space

With interleaved sampling, the sampling workload is spread over a series of frames, e.g. n frames. For example, half the sampling workload for every pixel p(r,s) is processed in a first frame and the other half in a second frame for pixel (p(r+1,s). The interleaved intermediate results are combined in the final result to a full sampled final result. This may be accomplished in either screen space (r,s) or a visibility (ray) space ($\varphi$, $\theta$). In this case, (r,s) refers to the surface points that correspond to the pixels on the screen, since the interest may be only in the RT relevant for this frame. The ray space ($\varphi$, $\theta$) may be given relative to the world coordinate system. The space of n directions ($\varphi$, $\theta$) may be split into k disjoint subsets and assigned one each to k adjacent pixels, delivering a stratified random sampling scheme. Since there may be reason to assume that v mostly exhibits smooth variants in all four dimensions, a reasonable reconstructions of v at full resolution may be obtained by filtering it with a 4-D Gaussian kernel (or a simpler approximation such as a hat or box filter). The resulting filtered visibility function may be projected into SH representation for every pixel.

In certain situations it may be desired to compute v for a single frame, e.g., there is no concern with a moving camera or a changing scene. The interleaved sampling approach may be extended to converge to a full sampling over time. This may be accomplished by computing the final result over n frames and n intermediate results (subsets) and assembling those intermediate results to a full sampled result. Assembling the final result may include re-projection since the camera is not naturally static.

Screen Space and Object Space Caching of Visibility

The visibility of a 3-D surface point may be naturally associated with an object space coordinate rather than a screen space coordinate. It may be therefore more natural to store the visibility computation in object space. However, since a voxel grid may be used, storing the SH information requires a large amount of memory. Instead, the following information may be stored: a visibility bit vector of length n, with every bit indicating the value v($\varphi$, $\theta$) for a particular direction, and a sampling convergence bit vector indicating which rays have already been traced.

Since the projection of the visibility into SH coefficients may also be an expensive computation, both the bit vector representation (in object space) and the SH representation (in image space, e.g., per pixel) may be stored. This allows for the re-use of the bit vectors and the SH representation independently, which becomes important for dealing with moving camera and changing scenes.

Adaptive Sampling

Rather than performing regular interleaved sampling, adaptive sampling may be employed to concentrate computation effort in regions where a visible difference may be expected. To that aim, a weighting mask in the screen space may be used that encodes the need for more sampling to support a better upsampling. This weighting mask may then be inspected (e.g., using a simple thresholding operation) to determine where more samples should be computed. After additional sampling, the SH projection for the affected surface point must be recomputed. It can be appreciated that several methods may be employed to obtain the weighting mask.

Visibility

Multiple factors can contribute to the weighting mask. To preserve shadow boundaries in the weighting mask, the 4-D variance over v(r, s, $\varphi$, $\theta$) may be computed. To compute the variance of the visibility signal, there must be subdivision into 4D regions. Every pixel (r,s) may be considered individually and the ray space ($\varphi$, $\theta$) may be subdivided into octants. Sampling may be initialized with a minimum of one ray per octant (8 rays per pixel). One octant of one pixel may be referred to as a region. Adaptive and/or interleaved sampling may compute more rays, the variance of which should of course consider all available rays for a region.

Whenever one or more rays are computed for a region, the summary may be computed for the region. The summary consists of the number of rays that have been computed, and the number of computed rays that have evaluated to one. This may be accomplished by counting the bits having a value of 1 (Hamming weight) in a segment of the visibility bit vector and sampling convergence bit vector. For n=128 rays per pixel and k=8 octants, the result is n/k=m=16 rays per region. The summary may be computed with a fast "population weight" technique and consists of 2*4=8 bits. The summaries are stored in screen space.

For a single summary, the variance may be pre-computed and stored within a global table with 256 entries for fast lookup. However, given that interleaved sampling may be desired, a filter needs to be applied over a larger region. This may be implemented by adding the information from several summaries together and then computing the variance of the result. The number of rays that are computed and the number of rays with value 1 separately may be added. This may be achieved by bit operations (e.g., shift-op, and op, additions, etc.)

For example, a region of several pixels around a particular pixel may be considered, or several octants may be considered together. Weights may also be applied to each of the regions in the filtering. Using weights of 1, 2, 4, and 8 allows the use of fast bit shifting for such.

If no more than 16 un-weighted regions are added, the resulting ray counts will fit into 2*8 bits. Therefore the actual variance may be pre-computed and stored in a 16-bit table. More regions may be considered and a 16-bit table may still be used if the least significant 1 or 2 bits may be discarded using a shift-op, essentially quantizing the result.

Differential Rendering

The weighting mask for adaptive sampling may be extended to also consider the results of differential rendering. The fact that a high quality solution for the entire scene does not need to be computed may be used. The interest may only lie in the visible parts after differential rendering, e.g., visible virtual parts and the shadows from virtual to real, which are visible. Only pixels near the boundaries of these regions must have a high quality. Therefore, the differential rendering result from the last frame may also be added, and re-projected into the current frame, as a weight. This may be done at a very coarse resolution. In other words, differential rendering can determine what may be and may not be important to render within the scene. With differential rendering, only the virtual object may be rendered on the real world background.

Geometry Buffers and Guided Filtering

The geometry of the real scene is obtained from the voxel grid by iso-surface ray tracing, while the geometry of the virtual objects may be given explicitly in polygonal form.

Since the geometry of the scene may be known and available, a depth and normal buffer for the current view may be calculated. The gradient images of these geometry buffers are computed and this information may be used for two objectives: (1) as a factor for the weighting mask (more sampling should be applied near depth or normal discontinuities) and (2) as a guidance buffer for joint bilateral filtering, both in the computation of the visibility reconstruction filter and for the variance.

Temporal Coherence

In general, the camera may be moving every frame, changing the resulting image. However, unless the camera may be moving extremely fast, most information in the image will remain valid. It can therefore be re-projected from a previous frame (the render cache) to the current frame. Using the standard approach of reverse re-projection, a pixel from the current frame is re-projected into the previous frame. The re-projection may be validated by comparing the re-projected depth with the one stored in the previous frame. If the pixel is successfully re-projected, the payload (information from the previous frame) may be extracted and reused. If the re-projection is not successful (e.g., in the case of disocclusions), the payload must be computed from scratch.

In some embodiments, the SH coefficients may be reused along with possibly the corresponding variance as the payload. Since two levels of caching are being used, SH in the image space and bit vectors in the object space, there are two levels of cache misses. If no payload is found in the image space, the corresponding voxel in the object space may be inspected to determine if the visibility as a bit vector has already been stored there. If a bit vector is found, it may be used to quick re-compute SH, otherwise some visibility ray-tracing must first be performed to initialize the bit vector.

If the camera moves away from a location and later moves back into the location, the SH coefficients corresponding to the location may be lost. However, the bit vectors may remain cached in the object space and may be reused.

Since re-projection may be usually done in combination with bilinear interpolation from the cache, many repeated re-projections may accumulate errors. Therefore, an age attribute may be assigned to the cache, which may be increased with every re-projection, following an exponential decay function. An old age strongly contributes to the weighting mask. The age can also be used as a weighting factor in the reconstruction filtering where older samples weigh less in the filtering.

Changing Geometry

Certain SDK algorithms (e.g., KinectFusion) may continuously evaluate the incoming stream of depth images to update a voxel grid representing the real scene in a volumetric form. Whenever a voxel may be updated, any visibility sampling information may be invalidated that may be stored in the associated bit vector for the updated voxel and all voxels in a reasonable size neighborhood (since the RT will change also for nearby voxels). The same may be done in the case where a virtual object moves.

In addition to invalidating the bit vectors in the object space, the geometry change in the image space must also be reflected (this may be seen as a cache write-through strategy). That is, the SH coefficients corresponding to the bit vectors are also reset.

Figure 4:
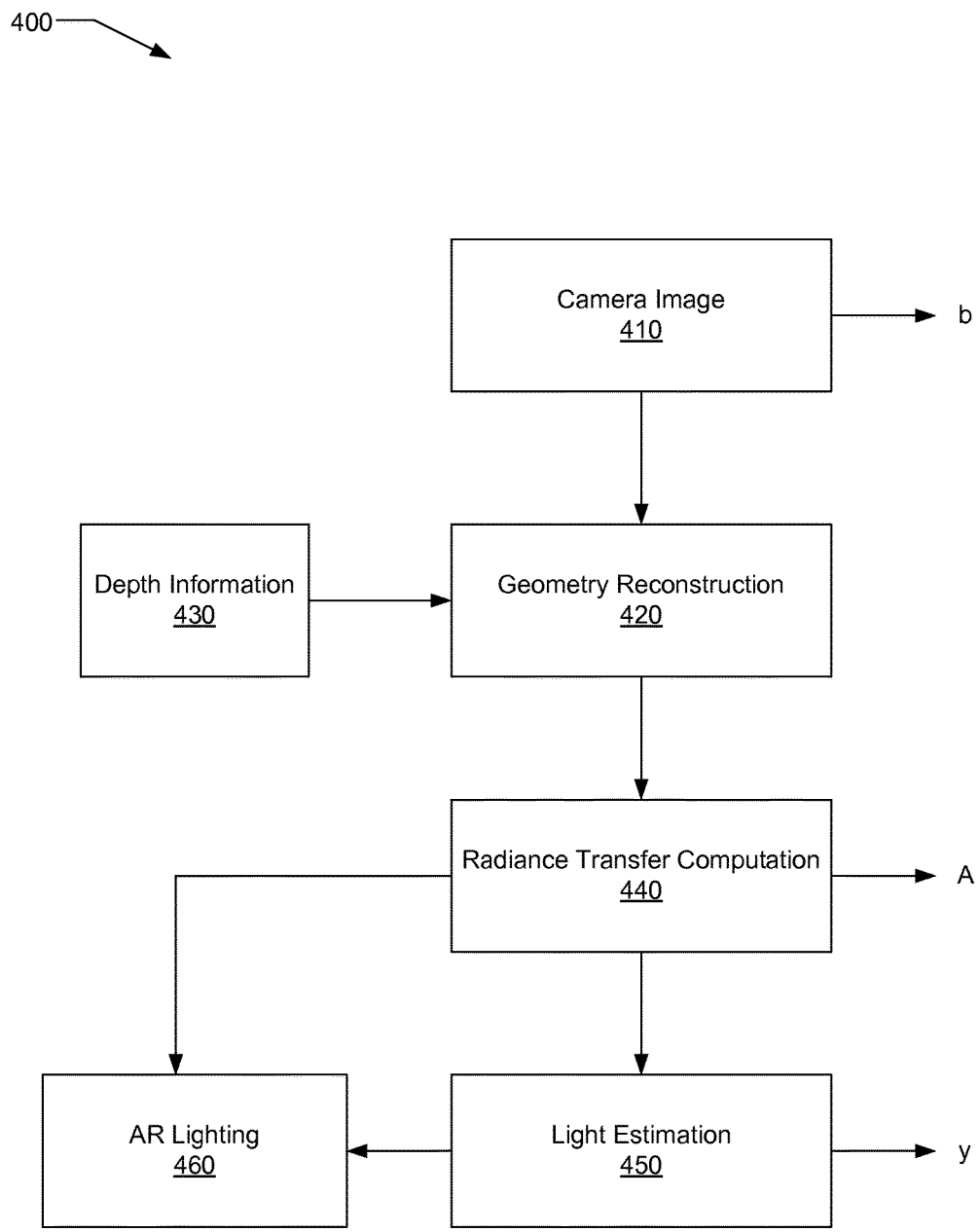
FIG. 4 is a general flow diagram illustrating the steps of a probe-less photometric registration pipeline, according to an embodiment of the present invention.

FIG. 4 is a general flow diagram 400 illustrating the steps of a probe-less photometric registration pipeline. The core part of the estimation may be the assembly of the linear equation system $Ay=b$, where A represents the radiance transfer, b is the vector with reflection observations from the camera image and y is the estimated environment light. As shown in FIG. 4, the first step 410 may be obtaining the camera image. The camera image may be captured with the camera 110 on device 100. The camera image may depict a real world scene. The geometry of the real world scene may then be reconstructed 420 by using depth information 430 based on the captured at least one video frame. In some embodiments, the camera may be fed depth information from another source, e.g., an external camera or mobile device that computes depth information usable in environment reconstruction. A radiance transfer computation 440 may then be computed to obtain a radiance transfer. The radiance transfer computation may be computed using the efficient radiance transfer sampling method described above. A light estimation 450 may then be performed on the real world scene and combined with the radiance transfer computation 440 to determine the lighting of the AR 460 (e.g., the virtual object) within the real world scene.

The efficient radiance transfer sampling method described above provides a number of benefits over existing solutions. First, the estimation of the diffuse lighting environment supports visual coherent rendering in augmented reality. The virtual objects can be lit by real-world lighting. Further, there may be support for the realistic integration of virtual data into the real-world data (camera image). No special light probes such as reflective mirror balls are necessary. Moreover, the method may be used in real-time and does not require any form of manual input.

Second, sampling in the screen and the visibility space over time using adaptive sampling based on different cues such as geometry, occlusion, and light estimation are improved over existing solutions. Also, ray-caching in the image and the world space are also improved.

Third, the performance improvements realized free sources for additional augmented reality lighting methods such as high frequency shadowing computing of shadow maps and inter-reflections from the camera image.

Figure 5:
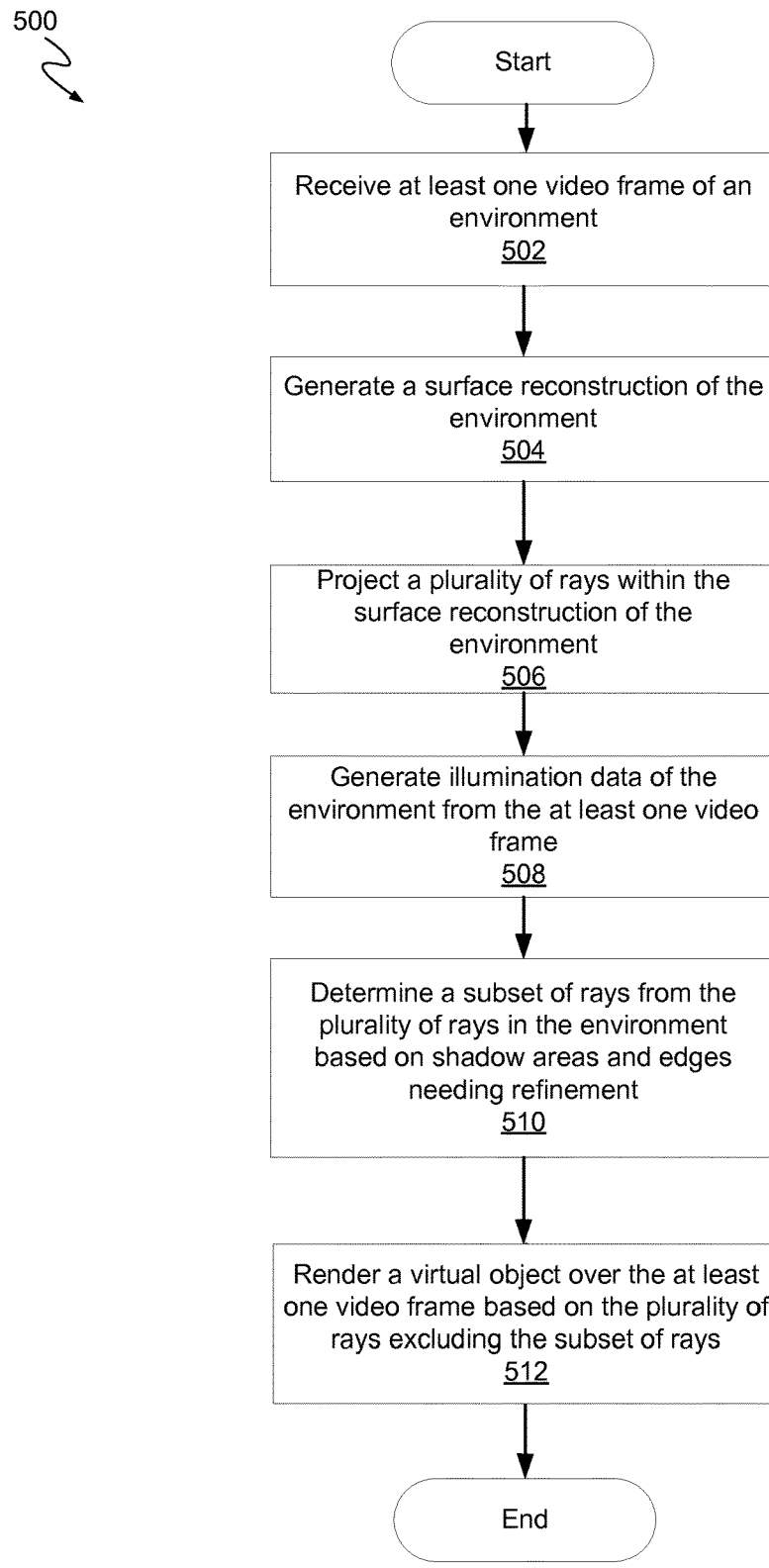
FIG. 5 is an illustrative flow chart depicting an exemplary operation for radiance transfer sampling for augmented reality.

FIG. 5 is an illustrative flow chart depicting an exemplary operation for radiance transfer sampling for augmented reality. In block 502, at least one video frame of an environment is received. The at least one video frame may be captured by a stereo camera device within a mobile device. For example, in FIG. 2, the camera may capture the at least one video frame. The captured at least one video frame may then be relayed to the processor or another module within the device 100 for further processing. In some embodiments, if desired, a monocular camera system, stereo camera system or a camera with a depth sensor, i.e., an RGBD camera may also be used.

In block 504, a surface reconstruction of the environment is generated. In some embodiments, generating the surface reconstruction of the environment is performed using the at least one video frame, images from a stereo camera, or a depth image from a depth camera. For example, in FIG. 2, the surface reconstruction unit 191 may generate a surface reconstruction of the environment using the at least one video frame captured from the camera. In some embodiments, the surface reconstruction of the environment may be generated using, e.g., multiple video frames from a monocular camera system, images from a stereo camera, or using depth data from a camera with a depth sensor.

In block 506, a plurality of rays are projected within the surface reconstruction. For example, in FIG. 3, the camera or viewpoint projects a plurality of rays toward the virtual object and real world object within the surface reconstruction. The projecting of the rays may be used to determine the surface of the geometry and to measure the reflection (the image intensities) of the surface points. The reflection measurements are in the image space. Once a ray hits the surface (e.g., at point x for the real-world object's surface and point z for the virtual world object's surface) the algorithm tests for visibility V(x) by sending out rays in different directions that uniformly sample a sphere. This is called the visibility space. A similar process may be carried out to test the visibility V(z).

In block 508, illumination data of the environment is generated from the at least one video frame. In some embodiments, generating the illumination data includes converting the at least one video frame into intensity components and color components. Generating the illumination data may also include denoising the intensity components to extract the illumination data. The illumination data may be generated by an illumination data unit. The illumination data may be generated using the intensity components to produce the illumination data.

In block 510, a subset of rays from the plurality of rays in the environment are determined. The determination may be made based on shadow areas and edges needing refinement. In some embodiments, the determining includes applying lighting and differential rendering techniques to the environment and analyzing shadow information as a result thereof. In other embodiments, the determining includes applying adaptive sampling techniques based on at least one of a 4-D subdivision of a ray space including the plurality of rays and an approximated variance analysis. For example, in FIG. 3, a subset of the plurality of rays projected into the environment are determined. The determination may be made on shadow areas and edges needing refinement within the surface reconstruction. The rays associated with those areas may be identified as the subset of rays.

In block 512, the virtual object is rendered over the video frames based on the plurality of rays excluding the subset of rays. The virtual object may be rendered using rays excluding rays associated with shadow areas or edges needing refinement.

In some embodiments, estimated lighting conditions of the environment may be generated in each video frame based on the surface reconstruction and the illumination data. The generation may be performed using a light estimation unit 195. The lighting conditions may be estimated by generating a radiance transfer for the environment based on the surface reconstruction and generating a compressed transfer function of the radiance transfer, e.g., by projecting the radiance transfer into SH basis functions. The light conditions may then be estimated using the compressed transfer function of the RT and the illumination data to estimate the lighting conditions.

In some embodiments, the temporal coherence information associated with the subset of rays may be stored in a two-level hierarchical cache, wherein the first level stores the information in a screen space and the second level stores the information in an object space.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 604—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method, comprising:
receiving at least one video frame of an environment;
generating a surface reconstruction of the environment;
projecting a plurality of rays within the surface reconstruction of the environment;
generating illumination data of the environment from the at least one video frame;
determining a subset of rays from the plurality of rays in the environment, wherein the determining a subset of rays from the plurality of rays comprises (1) applying adaptive sampling techniques based on a 4-D subdivision of a ray space comprising the plurality of rays into a plurality of 4-D regions and further based on an approximated variance analysis, wherein the adaptive sampling techniques comprise applying a weighting mask to the surface reconstruction of the environment and inspecting the weighting mask to determine a location where more samples should be computed, wherein the approximated variance analysis comprises computing, for each 4-D region, a variance value based on visibility information for rays in the 4-D region, and using the variance value as a contributing factor to the weighting mask, and (2) applying differential rendering techniques to the environment and analyzing shadow information as a result thereof;

generating estimated real world lighting data of the environment associated with the at least one video frame, based on the surface reconstruction, the illumination data, and the plurality of rays excluding the subset of rays; and rendering a virtual object over the at least one video frame using the estimated real world lighting data.

2. The method of claim 1 wherein the subset of rays from the plurality of rays in the environment is determined based on areas within the environment needing refinement, the areas within the environment needing refinement comprising shadow areas, surface edges, and shadow edges.

3. The method of claim 1 further comprising storing temporal coherence information associated with the subset of rays in a two-level hierarchical cache, wherein the first level stores the information in a screen space and the second level stores the information in an object space.

4. The method of claim 1 wherein generating the illumination data comprises:
converting the at least one video frame into intensity components and color components; and
denoising the intensity components to extract the illumination data.

5. The method of claim 1 wherein generating the surface reconstruction of the environment is performed using the at least one video frame.

6. The method of claim 1, wherein the adaptive sampling techniques further comprise recomputing a spherical harmonics (SH) projection for one or more surface points after determining where the more samples should be computed.

7. The method of claim 1, wherein the approximated variance analysis comprises computing a variance value based on combined visibility information for rays in multiple 4-D regions.

8. The method of claim 1, further comprising:
quantizing the variance values, the quantizing comprising discarding at least one bit of each variance value prior to storage in a lookup table.

9. The method of claim 1, wherein the visibility information for rays in a particular 4-D region indicates a total number of rays within the 4-D region that can be traced to an environmental light without being blocked by another surface point.

10. The method of claim 1, wherein the differential rendering techniques include projecting a differential rendering result from a previous frame into a current frame to form a weight for the weighting mask.

11. An apparatus, comprising:
a camera:
a memory; and
a processor coupled the memory to receive at least one video frame of an environment captured by the camera, wherein the processor is configured to:
generate a surface reconstruction of the environment;
project a plurality of rays within the surface reconstruction of the environment;
generate illumination data of the environment from the at least one video frame;
determine a subset of rays from the plurality of rays in the environment, wherein the determination of a subset of rays from the plurality of rays comprises (1) applying adaptive sampling techniques based on a 4-D subdivision of a ray space comprising the plurality of rays into a plurality of 4-D regions and further based on an approximated variance analysis, wherein the adaptive sampling techniques comprise applying a weighting mask to the surface reconstruction of the environment and inspecting the weighting mask to determine a location where more samples should be computed, wherein the approximated variance analysis comprises computing, for each 4-D region, a variance value based on visibility information for rays in the 4-D region, and wherein the variance value is a contributing factor to the weighting mask, and (2) applying differential rendering techniques to the environment and analyzing shadow information as a result thereof;

generate estimated real world lighting data of the environment associated with the at least one video frame, based on the surface reconstruction, the illumination data, and the plurality of rays excluding the subset of rays; and render a virtual object over the at least one video frame using the estimated real world lighting data.

12. The apparatus of claim 11 wherein the subset of rays from the plurality of rays in the environment is determined based on areas within the environment needing refinement, the areas within the environment needing refinement comprising shadow areas, surface edges, and shadow edges.

13. The apparatus of claim 11 wherein the processor is further configured to store temporal coherence information associated with the subset of rays in a two-level hierarchical cache, wherein the first level stores the information in a screen space and the second level stores the information in an object space.

14. The apparatus of claim 11 wherein generating the illumination data comprises:
converting the at least one video frame into intensity components and color components; and
denoising the intensity components to extract the illumination data.

15. The apparatus of claim 11 wherein generating the surface reconstruction of the environment is performed using the at least one video frame.

16. The apparatus of claim 11, wherein the adaptive sampling techniques further comprise recomputing a spherical harmonics (SH) projection for one or more surface points after determining where the more samples should be computed.

17. An apparatus, comprising:
processor implemented means for receiving a at least one video frame of an environment;
processor implemented means for generating a surface reconstruction of the environment;
processor implemented means for projecting a plurality of rays within the surface reconstruction of the environment;
processor implemented means for generating illumination data of the environment from the at least one video frame;
processor implemented means for determining a subset of rays from the plurality of rays in the environment, wherein the determining a subset of rays from the plurality of rays comprises (1) applying adaptive sampling techniques based on a 4-D subdivision of a ray space comprising the plurality of rays into a plurality of 4-D regions and further based on an approximated variance analysis, wherein the adaptive sampling techniques comprise applying a weighting mask to the surface reconstruction of the environment and inspecting the weighting mask to determine a location where more samples should be computed, wherein the approximated variance analysis comprises computing, for each 4-D region, a variance value based on visibility information for rays in the 4-D region, and wherein the variance value is a contributing factor to the weighting mask, and (2) applying differential rendering techniques to the environment and analyzing shadow information as a result thereof;

processor implemented means for generating estimated real world lighting data of the environment associated with the at least one video frame, based on the surface reconstruction, the illumination data, and the plurality of rays excluding the subset of rays; and processor implemented means for rendering a virtual object over the at least one video frame using the estimated real world lighting data.

18. The apparatus of claim 17 wherein the subset of rays from the plurality of rays in the environment is determined based on areas within the environment needing refinement, the areas within the environment needing refinement comprising shadow areas, surface edges, and shadow edges.

19. The apparatus of claim 17 further comprising processor implemented means for storing temporal coherence information associated with the subset of rays in a two-level hierarchical cache, wherein the first level stores the information in a screen space and the second level stores the information in an object space.

20. The apparatus of claim 17 wherein the processing means for generating the illumination data comprises:

processor implemented means for converting the at least one video frame into intensity components and color components; and processing means for denoising the intensity components to extract the illumination data.

21. The apparatus of claim 17, wherein the adaptive sampling techniques further comprise recomputing a spherical harmonics (SH) projection for one or more surface points after determining where the more samples should be computed.

22. A processor-readable non-transitory medium comprising processor readable instructions configured to cause a processor to:

receive a at least one video frame of an environment;
generate a surface reconstruction of the environment;
project a plurality of rays within the surface reconstruction of the environment;
generate illumination data of the environment from the at least one video frame;
determine a subset of rays from the plurality of rays in the environment, wherein the determination of a subset of rays from the plurality of rays comprises (1) applying adaptive sampling techniques based on a 4-D subdivision of a ray space comprising the plurality of rays into a plurality of 4-D regions and further based on an approximated variance analysis, wherein the adaptive sampling techniques comprise applying a weighting mask to the surface reconstruction of the environment and inspecting the weighting mask to determine a location where more samples should be computed, wherein the approximated variance analysis comprises computing, for each 4-D region, a variance value based on visibility information for rays in the 4-D region, and wherein the variance value is a contributing factor to the weighting mask, and (2) applying differential rendering techniques to the environment and analyzing shadow information as a result thereof;

generate estimated real world lighting data of the environment associated with the at least one video frame, based on the surface reconstruction, the illumination data, and the plurality of rays excluding the subset of rays; and render a virtual object over the at least one video frame using the estimated real world lighting data.

23. The processor-readable non-transitory medium of claim 22 wherein the subset of rays from the plurality of rays in the environment is determined based on areas within the environment needing refinement, the areas within the environment needing refinement comprising shadow areas, surface edges, and shadow edges.

24. The processor-readable non-transitory medium of claim 22 wherein the processor readable instructions are further configured to cause the processor to store temporal coherence information associated with the subset of rays in a two-level hierarchical cache, wherein the first level stores the information in a screen space and the second level stores the information in an object space.

25. The processor-readable non-transitory medium of claim 22 wherein generating the illumination data comprises:

converting the at least one video frame into intensity components and color components; and denoising the intensity components to extract the illumination data.

26. The processor-readable non-transitory medium of claim 22, wherein the adaptive sampling techniques further comprise recomputing a spherical harmonics (SH) projection for one or more surface points after determining where the more samples should be computed.

* * * * *